United States Patent [19]

Eickmann

[11] 4,136,845

[45] Jan. 30, 1979

[54] HYDRAULICALLY OPERATED AIRCRAFT WITH A RETRACTABLE PROPELLER

[76] Inventor: Karl Eickmann, 2420 Isshiki, Hayama-machi, Kanagawa-ken, Japan, 240-01

[21] Appl. No.: 760,006

[22] Filed: Jan. 17, 1977

Related U.S. Application Data

[63] Continuation-in-part of Ser. No. 487,272, Jul. 10, 1974, Pat. No. 4,009,849, which is a continuation-in-part of Ser. No. 104,676, Mar. 8, 1971, Pat. No. 3,823,898.

[51] Int. Cl.² .................... B64D 27/00; B64D 29/00
[52] U.S. Cl. .................................... 244/54; 244/12.4; 244/55; 244/56
[58] Field of Search ................ 244/12, 7, 6, 17.11, 244/17.21, 17.23, 53 R, 54, 55, 60, 65, 73 R, 62, 63, 48, 123, 66; 418/22-23, 210, 212; 60/486

[56] References Cited

U.S. PATENT DOCUMENTS

| | | | |
|---|---|---|---|
| 1,939,156 | 12/1933 | Wright | 244/53 R |
| 1,988,213 | 1/1935 | Ott | 418/22 |
| 2,349,286 | 5/1944 | Kreitner et al. | 244/65 |
| 2,360,433 | 10/1944 | Magruder | 244/123 |
| 2,708,081 | 5/1955 | Dobson | 244/7 C |
| 2,760,738 | 8/1956 | Robertson | 244/65 |
| 2,969,935 | 1/1961 | Price | 244/7 C |
| 2,988,152 | 6/1961 | Katzenberger et al. | 244/123 |
| 3,153,384 | 10/1964 | Castle, Jr. et al. | 418/22 |
| 3,181,810 | 5/1965 | Olson | 244/66 |
| 3,582,021 | 6/1971 | Pender | 244/7 A |
| 3,884,431 | 5/1975 | Burrell | 244/7 C |

FOREIGN PATENT DOCUMENTS

| | | | |
|---|---|---|---|
| 873563 | 2/1939 | France | 244/55 |
| 54807 | 8/1950 | France | 244/7 R |

*Primary Examiner*—Galen L. Barefoot

[57] ABSTRACT

An aircraft body has a pair of hydraulic fluid-operated motors mounted on it, a pair of stream-creating devices driven by the motors and symmetrically arranged on opposite sides of the body. One or more hydraulic fluid-flow producing devices has at least a pair of separate fluid-handling chambers each connected to one of a pair of separate outlets, and including arrangements for fluid-tight separation of the chambers and outlets, so that fluid from each chamber passes through only one of the outlets. A pair of displacement units is associated with the fluid-handling chambers, respectively, and an equally acting actuator arrangement cooperates equally with both of the two displacement units for maintaining equal movements of the two displacement units so that fluid flows in the outlets at proportionate and equal flow rates. A pair of delivery passages connects each of the outlets with a different one of the motors, respectively. A wing is attached to the body of the aircraft and includes at least one hollow space for the reception of a foldable propeller. The foldable propeller is attached to a hydraulic motor and driven by it. The hydraulic motor drives the propeller when the propeller is located outside of the hollow space and when the blades of the propeller are extended normal to the axis of the hydraulic motor. The blades of the propeller can be swung into a position about parallel to the axis of the hydraulic motor and the motor and propeller can then be retracted into the hollow space in the wing for rest.

1 Claim, 12 Drawing Figures

HYDRAULICALLY OPERATED AIRCRAFT WITH A RETRACTABLE PROPELLER

CROSS REFERENCE TO RELATED APPLICATION

This is a continuation in part application of my copending patent application entitled "Fluid Stream Driven Aircraft", filed on July 10th, 1974 and co-pending under Ser. No. 487,272, now U.S. Pat. No. 4,009,849, which is a continuation in part of application Ser. No. 104,676 filed on Mar. 8, 1971 and now partially U.S. Pat. No. 3,823,898.

BACKGROUND OF THE INVENTION

The present invention relates generally to an aircraft, and in particular to a fluid-stream driven aircraft.

In my aforementioned copending application, I have disclosed a fluid-stream driven aircraft having a plurality of fluid-driven propellers located at opposite sides of a medial vertical plane of substantial symmetry of the aircraft body.

I have found, however, that still further improvements over the invention disclosed in the copending application are desirable, in order to improve the safety and performance of the aircraft still more.

SUMMARY OF THE INVENTION

Accordingly, it is an object of the present invention to provide such further improvements.

More particularly, it is an object of the present invention to provide a fluid-stream driven aircraft which incorporates such improvements.

In keeping with these objects, and with others which will become apparent hereafter, one feature of the invention resides, in a fluid-stream driven aircraft, in a combination which comprises a body having a medial vertical plane of substantial symmetry, at least one pair of hyraulic-fluid operated motors on the body, and a pair of stream-creating means driven by the motors, respectively, and arranged symmetrically on opposite sides of the axis. At least one hydraulic fluid-flow producing means is provided, having at least a pair of separate fluid-handling chambers each connected to one of a pair of separate outlets, and including means for fluid-tight separation of the chambers and outlets so that fluid from each chamber passes through only one of these outlets. A pair of displacement means is associated with the fluid-handling chambers, respectively. Equally acting actuator means cooperates equally with both of the two displacement means for maintaining equal movements of the two displacement means so that fluid flows in the outlets at proportionate and equal flow rates. A pair of delivery passage means connects each of the outlets with a different one of the motors, respectively, so that the stream-creating means on opposite sides of the plane of symmetry are driven at equal velocities for producing equal thrusts on both sides of the axis to stabilize the movement and attitude of the aircraft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
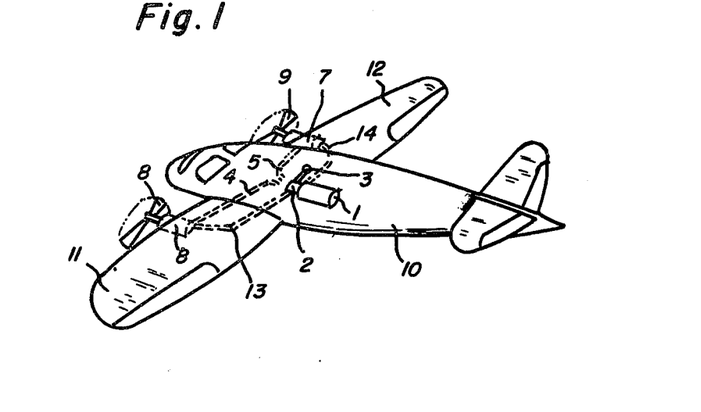
FIG. 1 is a somewhat simplified perspective view illustrating an aircraft provided with one embodiment of the invention.

Referring firstly to FIG. 1, it will be seen that the Figure illustrates an embodiment of a hyraulically controlled fluid-stream driven aircraft which is inexpensive to manufacture, handles well and easily and is very safe in operation. The aircraft has a body 10 provided with a pair of wings 11 and 12. A fluid-flow producing means is mounted on the body 10 and includes a power plant or prime mover 1, and a multiple-flow variable pump 2 of one of the types which will be described with reference to FIGS. 3-5. The rotor of the pump 2 is driven by the prime mover 1, and produces at least two separate flows or streams of hydraulic fluid. Adjusting means 3 is provided which adjusts the fluid flows in the different streams in a sense reducing or increasing the flow, but assuring that in any case the two flows are equal to one another at all times. The flows of fluid may be varied simultaneously between a zero flow rate and the maximum flow rate. Reference numerals 4 and 5 identify fluid passages which extend from the pump 2 to respective positive-displacement fluid motors 6 and 7, which drive propellers 8 and 9, respectively. The spent fluid returns from the motors 6 and 7 via respective return conduits 13 and 14 to the pump 2.

Figure 3:
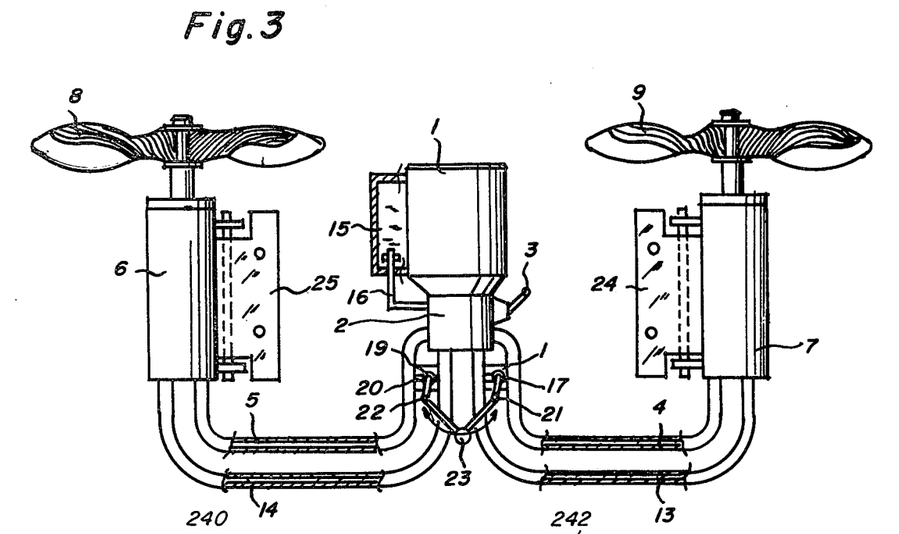
FIG. 3 is a partly sectioned view illustrating a hydrostatic power supply according to the present invention.

A hydrostatic power supply unit which can be used with advantage in the embodiment of FIG. 1, and which has in fact been diagrammatically illustrated therein, is shown in more detail in FIG. 3. It should be noted that this power unit is of a type which can be separately transported and secured to any desired craft, such as the aircraft in FIG. 1.

Like reference numerals in FIG. 3 identify the same components as in FIG. 1. Reference numeral 15 identifies a reservoir for fluid, from which the fluid flow producing means 1 receives the fluid via two lines 16 (only one shown). The fluid flow actuator means 3 acts equally in order to control the displacement volume of the displacement chambers in the fluid-flow producing means 1 (which may be of the type disclosed in FIG. 5) proportionately to each other if they change their volume. The means 3, therefore, assures that at all times at least a plurality of flows, such as a pair of flows, of equal flow rate or of proportional rate of flow travels from the fluid-flow producing means 1 separately into the fluid lines 4 and 5, to assure the proportionality of angular velocity of the propellers 8 and 9 at all times. Bypass lines 17, 18, 19, 20 may be provided between the outgoing fluid lines 4 and 5 and the respective return fluid lines 13 and 14, to enable the flow of a small fraction of fluid which flows through the delivery fluid lines 4 and 5, back into the return fluid lines 13 and 14. The bypasses may be operated separately from each other, or they may be operated in combination by an operating means 23 connected to the valves 21, 22 of the bypasses. By using the combined operating means 23, which again is to act equally and cooperate with both of the sets of in- and outgoing fluid lines, it is possible with a single operating control to change the rotary velocity of the propellers 8 and 9 relative to each other, and thus by using only a single handle to change the thrust of the fluid streams produced by the propellers 8 and 9 in any desired way.

Figure 2:
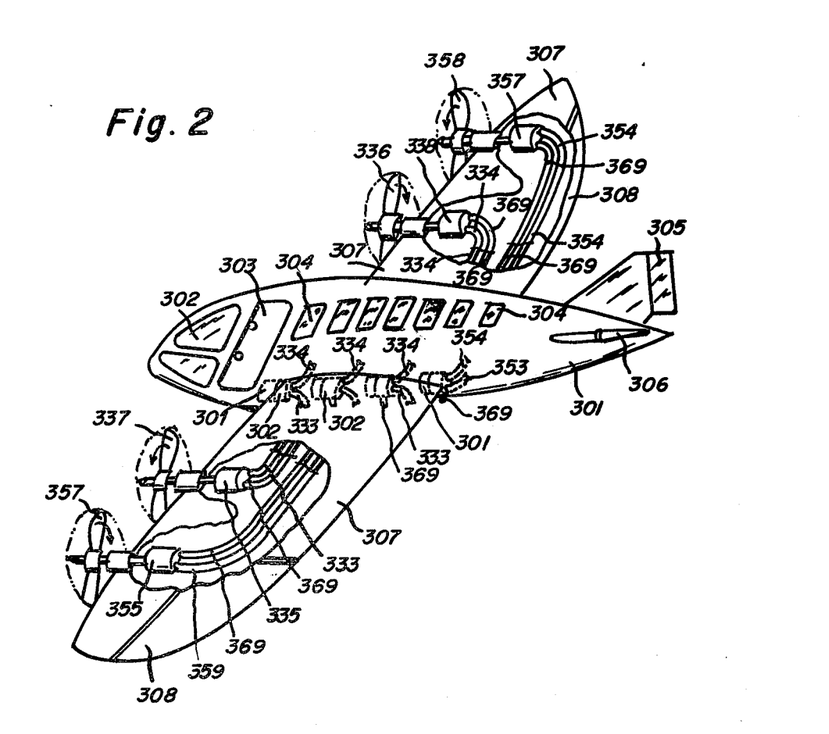
FIG. 2 is a view analogous to FIG. 1, partly broken away, but illustrating an aircraft incorporating a different embodiment of the invention.

FIG. 2 illustrates by way of example a further aircraft somewhat analogous to that of FIG. 1, but provided with a plurality of pairs of propellers, namely four propellers 336, 337, 357 and 358. Thus, for example, one set of propellers 336, 337 may be of the fixed type which cannot have the pitch of its blades changed, whereas the propellers 357 and 358 may be of the adjustable type where the pitch of the blades can be changed.

Alternatively the pair of inboard propellers 337, 338 may have blades of one inclination of angle of attack and the pair of outboard propellers 357, 358 may have a different inclination of angle of attack. Thereby, one pair of propellers can be very effective at low speeds and the other pair of blades can be very effective at high speeds of the aircraft.

Since in FIG. 2 there are several pairs of propellers provided, the embodiment of FIG. 2 must also have several separated fluid streams of equal rate of flow. The fluid flow 333 drives the fluid motor 335 and returns via a return line 369. Fluid flow 334 drives fluid motor 338. Fluid flow 354 drives fluid motor 356. All of the fluid flows return through their respective return lines 369 directly or indirectly to the fluid flow producing means. All of the flows 333 and 334 are of equal or proportionate rate of flow. The other pair of fluid flows 353 and 354 is also separated from each other and they are also of proportionate rate of flow. A plurality of fluid-flow producing means 302 is provided, which may be driven by a plurality of power plants 301.

The relatively compact size of the fluid motors makes it possible to locate them in small spaces in the wings 307. The construction makes it possible to have the propellers 337, 336, 357, 358 rotate in opposite directions, because it is simple to reverse the direction of rotation of the fluid motor. Thus, propellers 337 and 338 may, for instance, revolve in mutually opposite directions.

The aircraft has a freight or passenger cabin 304, and an entrance 303 into the same. Cabin 302 may be provided as a pilot cabin. It should be noted that it is possible and in fact preferred to have the heavier components of the drive, such as the power plants and fluid-flow producing means, located at the bottom of the body 301 of the aircraft. Equally acting actuator means cooperates equally with all fluid-flow producing means, or rather with the displacement means in the fluid-handling chambers thereof, and this has the advantage that by means of a single control the rate of flow of fluid of all of the fluid streams can be controlled, and thereby the angular velocities of all of the propellers. Reference numerals 305 and 306 identify control rudders, and the flaps on the rings 307 are identified with reference numeral 308. Details of the construction and operation of FIGS. 1, 2, 3 and 4 are already to be found in the aforementioned copending application, the disclosure of which is incorporated herein by reference.

The hydraulic driving and control arrangement illustrated in FIG. 3 is a unit which can be mounted on any type of vehicle. This unit includes a power plant driving fluid flow producing means 1 having outputs with proportional or equal delivery rates, connected to respective supply lines 4 and 5 which deliver working hydraulic fluid to respective positive displacement fluid motors 6 and 7 at proportionate or equal flow rates. Respective return lines 14 and 13 connect motors 6 and 7 to fluid flow producing means 1, which may withdraw fluid from tank or reservoir 15 through line 16 and which is preferably provided with a fluid flow adjusting means 3 effective to control the displacement value of the displacement chambers therein in proportion to each other. Control adjustment means 3 thus assures that, at all times, hydraulic working fluid is supplied to the motors 6 and 7, driving propellers 8 and 9, at equal or proportionate rates of flow and in supply lines which are separate from each other.

Respective bypass lines 17 and 19, each including a respective control means 18 and 20, interconnect respective supply lines 4 and 5 to respective return lines 13 and 14. Bypass lines 17 and 19 have a very small cross-sectional area, compared to those of supply lines 4 and 5, and thus allow bypassing only a small portion or fraction of the working fluid. Control means 18 and 20 may be operated separately or may be conjointly operated through connection means 21 and 22 connected to a combined operating means 23. By using means or handle 23, it is possible to change the relative angular velocities of propellers 8 and 9 by operating only a single control handle.

The unit shown in FIG. 3 is transportable and may be mounted on any kind of vehicle by the adapting means 24 and 25, with the mounting on the vehicle being effected in a manner such that motors 6 and 7 are located symmetrically on opposite sides of the vehicle longitudinal axis. By virtue of a pivoting arrangement provided between each adapting member and the associated motor, the motors 6 and 7 can be swung into or out of the vehicle.

Figure 4:
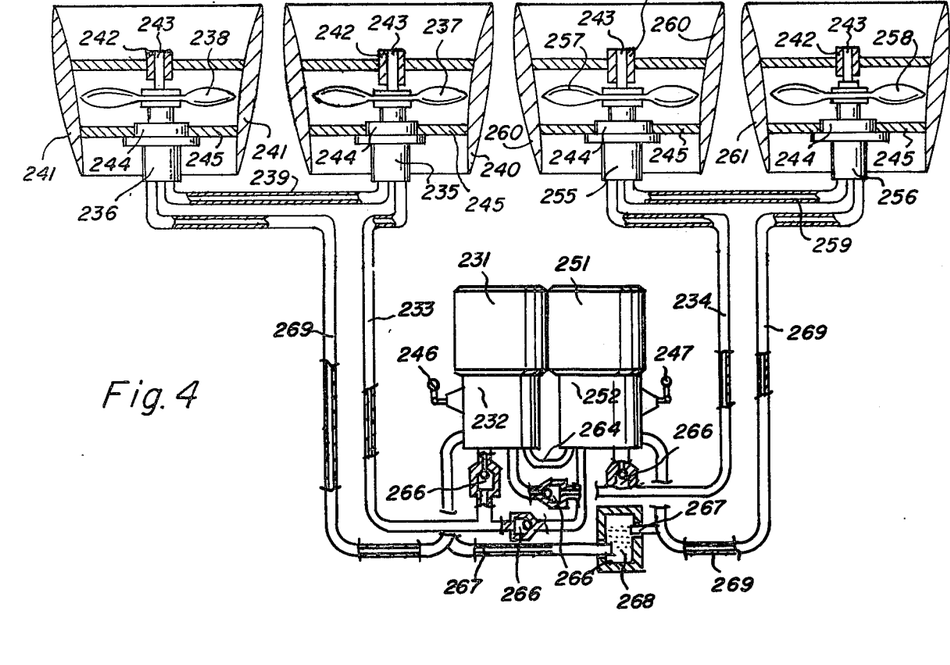
FIG. 4 is a view analogous to FIG. 3, but illustrating a further embodiment of the power supply.

In FIG. 4, a plurality of fluid-flow producing means 232 and 252 are provided and actuated by power plants 231 and 251, respectively. They are connected with one another in that they may have a common return or interconnecting return fluid line 264. They may also have delivery fluid lines which transfer fluid out of a tank 268 into the respective fluid flow producing means 232 and 252, and the latter each produces at least a pair of separated fluid streams of proportionate rate of flow. One fluid stream moves out of the fluid-flow producing means 232 through a check valve 266 into the fluid line 233, and another fluid stream of proportionate rate of flow travels separately from the fluid-flow producing means 252 through check valve 266 which is associated with the latter, into the common fluid line 233.

Another flow of fluid flows from the fluid-flow producing means 233 at proportionate rate of flow through another check valve 266 into the fluid line 234, and still another flow of fluid which is also separated and of proportionate rate of flow, flows from the fluid-flow producing means 252 through an additional check valve 266 into the fluid line 234. In the event that during the operation one of the power plants 231 or 251 should fail, or if one of the fluid-flow producing means 232 or 252 should fail, then the other fluid-flow producing means would still continue to deliver at least one flow of fluid into each of the common fluid lines 233 and 234, respectively. The respective check valves 266 would prevent a return flow of fluid from the common fluid lines 233 and 234 back into the fluid-flow producing means which is not operating, so that a safe operation of the system would still be assured as long as only one of the fluid-flow producing means or power plants continues to operate.

The return fluid lines 269 may return the return flow of fluids directly or indirectly into the tank 268, or via cooling means into the tank 268, or else directly into the respective fluid-flow producing means 232 or 252, or into the passage 264. The passage 264, incidentally, may be a drain line if desired. The fluid lines 267 may be suction fluid lines, or fluid lines which deliver fluid into the fluid-flow producing means 232 or 252. It is apparent that instead of providing only two fluid-flow producing means 232 and 252, it would be possible to utilize more of them, and if necessary to utilize also more of the power plants 231 and 251, in which case the system illustrated in FIG. 2 could be obtained.

The fluid-flow producing means 232 and 252 are advantageously provided with fluid-flow adjusting means 246 and 247, so that the displacement volumes of the positive displacement chambers in the fluid-flow producing means, which change from minimum to maximum and vice versa during the operation of the fluid-flow producing means, will be proportionately adjusted so that the subtraction of the minimum volume from the maximum volume of the respective positive displacement chamber remains at all times proportionate to the respective volumes of others of the positive displacement chambers. The adjusting means 246 or 247 could be operated separately or in combination.

Figure 5:
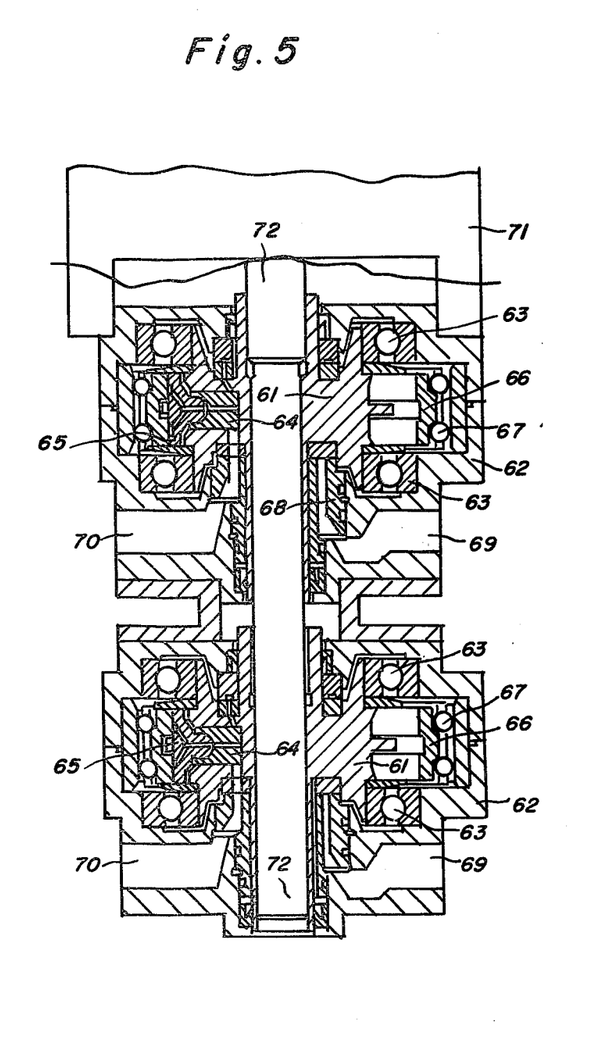
FIG. 5 is a fragmentary sectional illustration showing another embodiment of the invention.

FIG. 5 illustrates in detail how in any of the preceding embodiments equally acting actuator means may cooperate equally with the displacement means of the fluid-handling chambers of the respective fluid-flow producing means. In this Figure, reference numeral 71 identifies a power plant which drives a shaft 72 that extends through two coaxial pumps. In the pumps the rotors 61 are rotatably mounted in housings 62. Displacement means 64 serve to draw in and expel fluid with respect to the cylinders in the rotors 61. Piston shoes 65 may be associated with the displacement means 64 which are pistons, between the latter and the actuator means 66, which enforce a definite displacement or stroke of the displacement means 64 in order to actuate each fluid flow at a definite rate of flow. Antifriction bearing 63 may be provided between the rotors 61 and the housings 62, and additional antifriction bearing 67 may be provided between the actuator means 66 and the housings 62. A control member 68 may be provided to establish a fluid-tight seal between the respective rotor 61 and housing 62, and a pair of ports of which one serves for entry of fluid and one for exit of fluid is provided in each pump and communicates with the respective cylinders through passage means located in the housing and rotor and the control body if the latter is present.

The shaft 72 drives both pumps with equal rotary velocity and may extend through both pumps, but is associated with the engine or power plant and with both of the pumps together.

The two actuator means 66 are so assembled that they act equally, that is they cooperate equally with both pumps to assure that the rate of fluid flowing out of each pump is equal to the rate of fluid flowing out of the other pump. In the illustrated embodiment, the pumps are radial piston pumps, and the pistons 65 and piston shoes which cooperate with the respective actuator means 66 are so controlled by the latter that equal flow rates are assured, since in each pump the central axis of the actuator means 66 is equally spaced from the rotor axis.

Of course, various modifications would be possible. Thus, instead of providing the two pumps in a coaxial arrangement, a plurality of pumps could be driven by a multiple gear.

Figure 6:
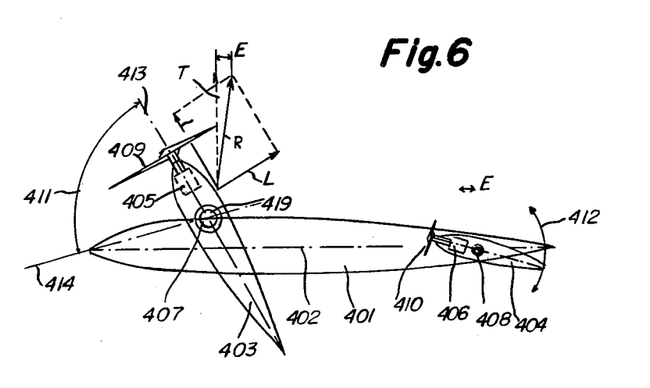
FIG. 6 is a schematic sketch of a vertical take off aircraft seen from the side having inclinable wing means and a swingable elevator - wing both with propellers borne and driven by fluid motors.

Referring now to FIG. 6 the aircraft demonstrated therein as a specific embodiment of the invention has a body 401 with a longitudinal medial plane 402. On the front portion or medial portion of body 401 is a swing bearing 407 provided which bears swingably mounted the main bar 419 of the wing 403. Angle 411 shows that the wing 403 can be pivoted from a vertical take off axis position 413 down to a horizontal gliding position 414 with downward inclined angle of attack. Wing 403 has at least one, but better at least a pair, of fluid motor 405 for driving or for driving and holding a respective propeller or propellers 409. On the rear portion of the aircraft a swingable elevator wing is mounted and swingable around pivot centre 408. The angle of pivotability upward and downward is shown by angle 412. The elevator-wing has referential 404 and it is provided with a fluid motor 406 for driving or driving and carrying the propeller 410.

The aircraft of FIG. 6 is for vertical or horizontal flight, landing or take-off. The hydraulic motor(s) 405 of the main wing 403 drives propeller(s) 409 also in the upwards inclined position 413. The propeller(s) 409 tehreby forces air with high velocity over the main wing 403. This creates a lift L on the wing 403. On the other hand the propeller 409 excerts a propeller traction S in the direction of wing axis 413. Both components of forces together apply a force R onto the body of the aircraft. This force resultant R may be seen as a vertical upward force component T and a horizontally backward component E in the specific angular and forcesplay as demonstrated in FIG. 6. This would result in an upwards lift and backwards tracting of the aircraft. Since however a hydraulic propeller driving motor 406 is provided before the elevator-wing 404 the propeller 410 forces air over the elevator 404. Thereby elevator 404 can also in stand or in vertical take off, when no natural flow flows over the elevator be used for control of the horizontatity of the body 401 of the craft. By swinging or pivoting the elevator wing 404 around centre 408 of swing the pivoting within the angular range 412 lifts or sinks the rear portion of the body 401 of the specific aircraft of FIG. 6. By this means the aircraft can be kept in any desired inclination relatively to the surface of the earth. Without the location of hydraulic motor 406 relatively to the elevator 404 and driving by said motor or motors a propeller or propellers on the elevator or relatively located to the elevator, so, that air is forced over the elevator, the aircraft would not be stable at vertical take off, landing or flight.

In addition the propeller(s) 410 of elevator 404 provides a traction onto the elevator 404 in the forward direction and of the size E. By making traction E equal to the backward component E of R the aircraft is brought into balance of forces. It now lifts vertically up without forward or backward move. The so remaining final summation of forces on the aircraft of FIG. 6 is T and is vertically a= upward directed. The aircraft goes vertically up or down or hovers in air.

This is an example how for practical application a one-winged aircraft can be made to take off vertically by controlling such take off by angle 411 of the wing and by providing the propeller to the elevator and by angular control of the elevator 404.

For forward flight the main wing 403 is pivoted forward towards the position 414 to come to rest either between positions 413 and 414 or in position 414.

Figure 7:
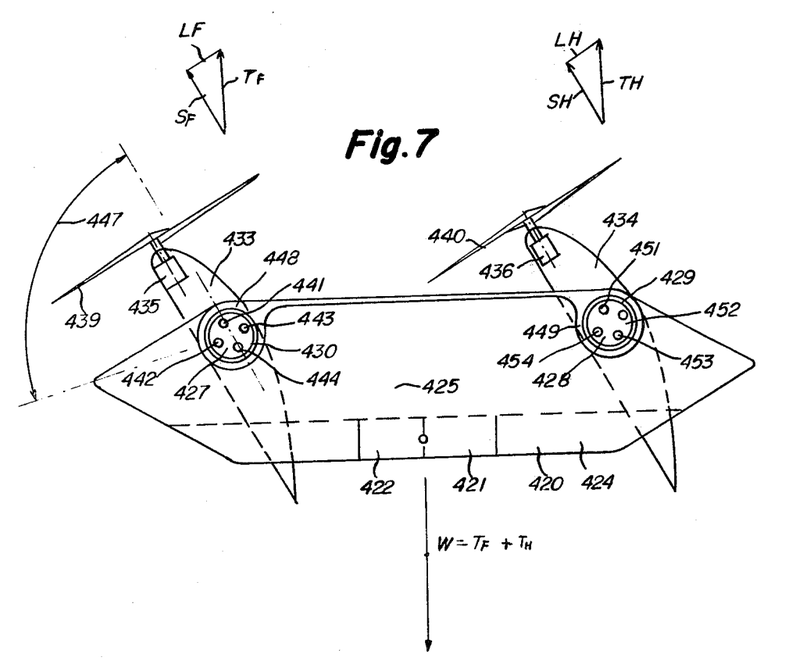
FIG. 7 shows a longitudinal sectional view through a vertical and horizontal flying or landing or take - off aircraft with swingable wings and hydraulic motors in said wings for driving propellers and whereby said longitudinal view is taken through the wings, laterally of the body of the aircraft.

In FIG. 7 a double winged aircraft is shown, having a body 420 with a heavy weight compartment 424 and a freight or passenger cabine 425. The heavy weight compartment preferably contains the power plants, engines, pumps, 421 and 422 and other heavy material to form the weight centre in the middle, but low in the body 420 of the aircraft. The body 420 is also provided with two or more wing bearings 448 and 449 wherein the main bone-structures 430, 429 of the wings 433, 433 can be pivoted with said wings at an angular intervall 447. The main bar or main bone of the wings may contain fluid lines 442,443,444,441,451,452,453,454 to fluid motors 435,436 for driving the said motors and thereby the propellers 439,440 which are associated to said fluid motors. Said fluid lines communicate respective chamber-groups of respective pump means with respective fluid motors.

The propellers 439,440 force air with high velocity over the wings 433,434. The profile of said wings then provides a wing-lift L which is named LF for the front wing and LH for the rear wing. The direction of said wing lifts LF and LH is however not upwards, but upwards to the rear as shown in the component arrow diagram of the figure when the wings have the angular pivot-position as shown in the figure. At same time the propellers 435,440 provide a traction S in the direction of the axis of propeller and fluid motor. Front traction is cited by SF and rear traction of propeller is cited by SH. The component of forces diagram shows, that these forces SF plus LF summarize to the upward directed front force TF and at the rear of the craft the forces SH and LH summarize to the upward force TH. Both forces TF and TH are upwards directed, parallel to each other and equally distanced from the centre of the craft. The weight W is downward directed from centre 455. Forces TF plus TH and contrary directed force W keep the aircraft in straight position. Increasing the sum TF plus TH over W brings vertical upwards move of the aircraft. Equalizing gives hovering and decreasing of the sum TF + TH below W gives vertical sinking of the aircraft of the figure.

For forward flight both wings 433 and 434 are downward forwardly inclined within the range of angle intervall 447 depending on the desired flight path of the craft relatively to the horizontale.

For all those aircraft which are described in this specification as vertical or horizontal flying, landing or take off aircraft it is required, that the engines, pumps and motors are of little weight but of great power. Such capabilities are not common to usual engines, pumps or motors. Suitable less weight powerful engines, pumps and fluid motors are however available by the patents of the inventor of this application. If they are used, the vertical take off and landing or otherwise horizontally flying winged aircraft becomes a comfortable reality. To use non-suitable pumps, engines, motors will however result in failure, because they may be too heavy compared to their power or too unreliable.

Figure 8:
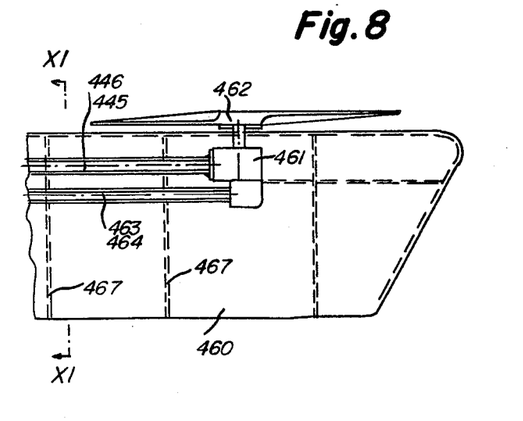
FIG. 8 is a view from above and partially sectionally through an aircraft wing or blade containing fluid lines which built or may built a part of the structure of said wing or blade and wherein said wing or blade, for example propeller blade is provided with an hydraulic or fluid motor.
Figure 11:
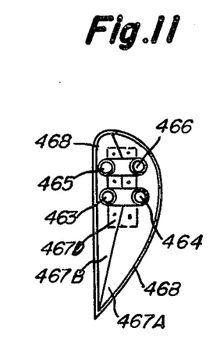
FIG. 11 is a cross-sectional view through FIG. 8 along the line XI—XI.

In FIG. 8 and thereto belonging sectional view, FIG. 11, a less weight wing or propeller or blade is shown, wherein the fluid lines form at least a portion of the main structure bone or bar of the said wing or blade. Two or more fluid lines, like pipes, namely 465,466,463,464 form together a holding main structure. They lead for example from a holding on the aircraft to a respective fluid motor(s) 461 for driving a thereto associated or thereby borne propeller 462. Said fluid lines can be able alone to hold and supply motor(s) 461. But in addition they may be utilized to form the wing 460 and to make the wing 460 strong and holdeable. Ribs 467 may be set around the fluid lines. In FIG. 11 they are shown as rib-portions 467-A and 467-B. Setting one of them from below and the other from up around the said fluid lines gives a strong wing-rib. They may be so configurated to keep the fluid pipes fastened between them. A medial rib-portion 467-D may be applied to rivet portions 447-A and B together to form a complete wing rib and to contain in fixed position therein two or a plurality of two or any other plurality of fluid lines or at least one fluid line. After fastening the fluid lines to the fluid motor and setting the rib portions around the fluid lines the ribs may be provied with the wing-cover 468 and said cover may be fastened to the said ribs of the wing.

The arrangement of this figure spares the heretofore provided main bars of the wings and eleminates the weight making setting of fluid lines plus wing-structure bone-bars. The wing of these figures is therefore especially suitable for hydraulically operated aircraft for vertical or horizontal or combined flight.

Figure 9:
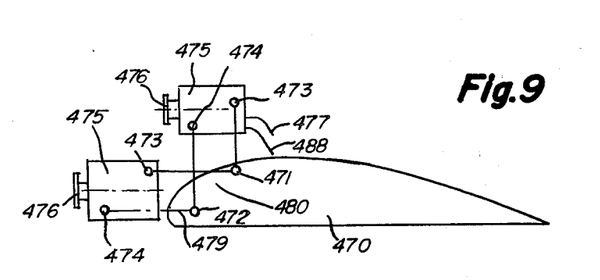
FIG. 9 is a schematic cross-sectional view through an aircraft wing whereon a swingable hydraulic propeller driving motor is mounted for swing into a position above the wing or into a position before or after the wing or into any position therebetween, if so desired.

In FIG. 9 it is shown by way of example, how a hydraulic fluid motor is associated to a wing or body, Wing 470 has holders 471 and 472 which pivotably bear swing-arms 479 and 480. These are connected by connectors 473 and 474 to propeller-driving fluid motor 475. Fluid motor 475 has a revolvable shaft 476 for holding and driving a respective propeller, the latter not shown in the figure. For starting or landing on water or on ground the propeller motor 475 is pivoted into the above wing position, the right-up in the figure. That prevents water coming to the propellers or the propellers coming too close to the ground. In high-speed flight the location of the propeller-axis above the wing however provides a tilting moment to the craft and the forces of resistance and of traction are not in the same plane.

Therefore, according to this figure the fluid motor is pivoted forward or backward downward into the left-shown position for acting substantially about in the centre face through the wing or body. This stabilizes the craft in the air at flight. The swing of the motor from above to before or behind the wing or vice versa is possible due to flexible fluid lines or hoses 477,478. Thus, the aircraft wing or body of the figure is especially convenient for low-winged aircraft, for water-aircraft, motor gliders and like.

Figure 10:
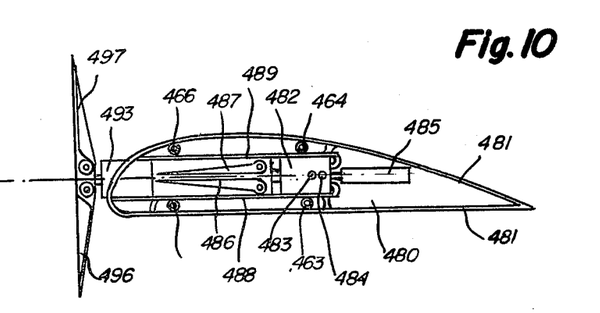
FIG. 10 is a cross-sectional view through an improved wing of an aircraft which contains a guide for a retractable propeller driving motor and wherein the propeller and motor are shown in a retracted and in an operational position.

FIG. 10 demonstrates an arrangement in an aircraft wing, which is especially attractive and useable to vertical take off aircraft or to motor gliders and like.

For vertical take off big diameter propellers or many propellers are needed. Otherwise the lifting efficiency becomes so bad, that the aircraft will not lift, if economic engines, like piston or rotary, not turbine-engines are provided.

At sailing of the glider or at high speed flight of the aircraft the propeller(s) may make too much drag to fly economical or at high speed. It is therefore desired, to retract one or more of the propeller(s) into the body or into the wing.

That is accomplished by retracting the propeller-driving fluid motor with its associated propeller into the body or wing. And to move it out and into action again, if so desired. Wing or body 470 has guide means 488,489 for guiding or sliding the fluid motor 482. Motor 482 is once shown in the retracted position inside of the wing. It is also shown in the other position as motor 493. Operator means 485 may either retract the motor with propeller into the wing 480 or out of it into operating position. In operating position propeller arms 496 and 497 may be swung out into operating position by remote control or automatically. In the retracted position the propeller arms 486 and 487 may be swung forward about 90 degrees to be able to form a narrow device for being retractable into the wing or even into the guide means 488,489. Fluid lines 466,465,463,464 may again, for example as in FIGS. 8,11 or 7 form the bone(s) of the wing and may hold the guide means 488,489.

Figure 12:
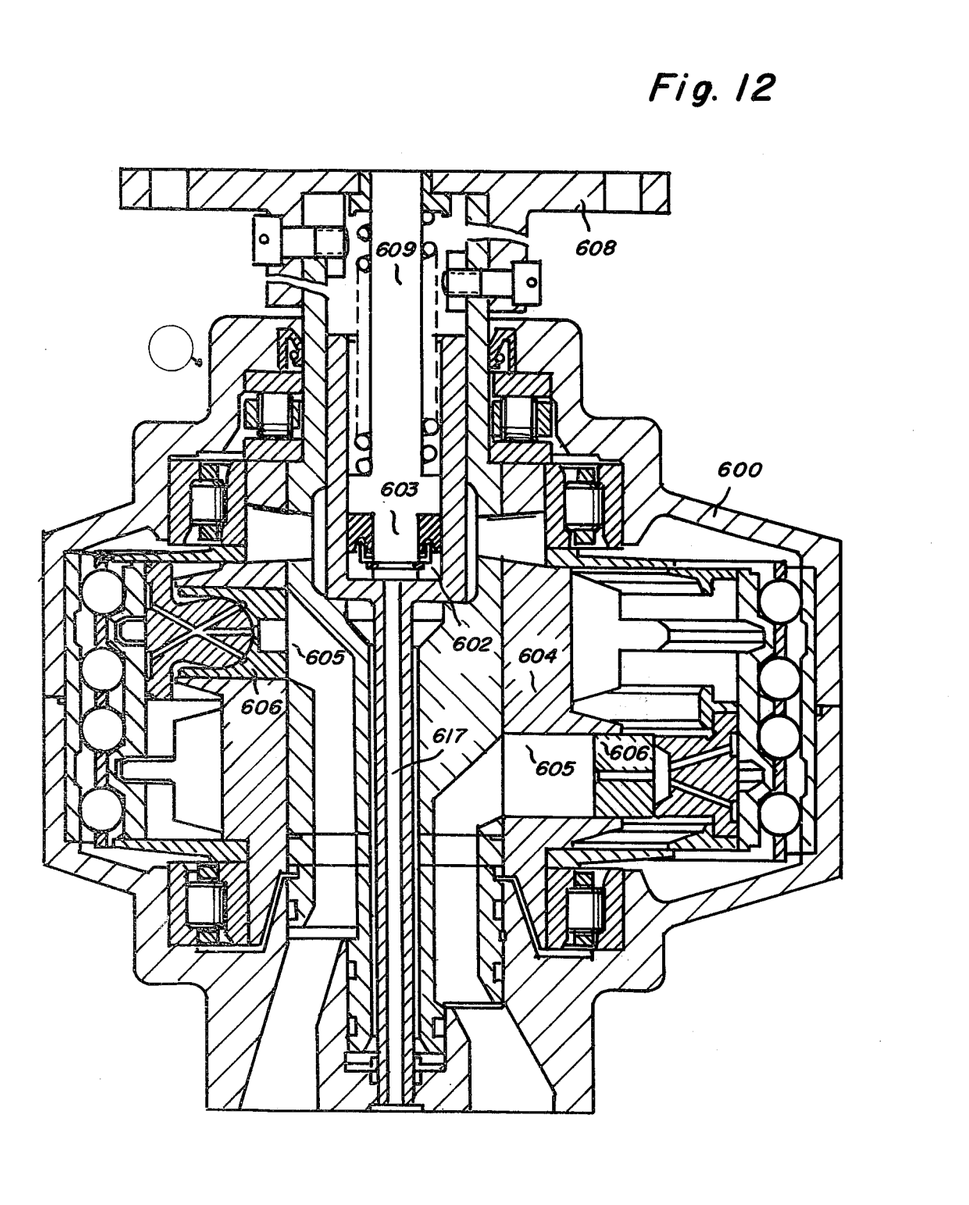
FIG. 12 is a longitudinal sectional view through an embodiment of a propeller - driving fluid motor of the invention.

The retraction into the wing, as shown in the figure, makes it possible to provide economically a plurality of propellers to wings and to bring them back into the wing(s) if so desired. Thus, this wing has the capability to provide an economic vertical take off aircraft for the money the average man can spend and said vertical take off aircraft will well be able to be transformed in flight to an economic high speed aircraft. For example the propeller or propeller-pair for high speed flight may be of variable pitch. The propeller or propeller-pairs for vertical take-off may be of the swing in-retractable type of FIG. 10. Flexible hoses may lead to ports 483 and/or 484 of motor 482. Closing covers may be moved over the open guide portion between 488 and 489 as soon as the propeller and its motor are retracted into the wing, so, that wing 480 is a fully closed wing with cover 481 when the motor and propeller are retracted into it. In FIG. 12, which is a longitudinal sectional view through an example of a propeller-driving fluid motor, the housing 600 contains revolvingly borne therein the rotor 604 which has working chambers 605 for intaking fluid and driving pistons 606 in said chambers 605 for revolving the rotor 604 of the motor. The rotor of this embodiment of the invention is provided with a central bore or hub which extends also through the entire motor. A cylinder or thrust chamber 602 is provided in or on the motor and a member or piston 603 is moveable therein. It may be excerted from the other end by spring pressure. It is especially convenient to provide space 602 as a cylinder provided in the rotor hub and a piston 603 axially moveable therein. A fluidline 607 extends through at least a portion of rotor 604 to said space 602 to operate the member 603 therein by fluid pressure. Propeller flange 608 may be mounted to the shaft and rotor of the motor; and member 609 associated to member 603 may extend through propeller shaft 608 to control and drive the variable or swingable members or portions of the associated propeller.

It will be understood that each of the elements described above, or two or more together, may also find a useful application in other types of constructions differing from the type described above.

While the invention has been illustrated and described as embodied in a fluid-stream driven aircraft, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims:

1. A fluid-stream driven aircraft, comprising, a body having a medial plane of substantial symmetry; at least one wing extending substantially on both opposite sides of said plane; at least one pair of hydraulic fluid operated motors on portions of said aircraft; at least one pair of fluid stream creating means driven by said motors, respectively, and arranged symmetrically on opposite sides of said medial plane; at least one hydraulic fluid flow producing means having at least one pair of separate fluid-handling chamber groups of equal volumes, at least one pair of separate outlets with each one of said chamber groups connected to one outlet of said outlets, respectively, and including means for fluid-tight separation of the chambers and outlets so that fluid from each chamber group passes through one of said outlets only; at least one pair of displacement means associated with said fluid-handling chambers, respectively; equally acting actuator means actuating and defining the displacement volumes of said chambers, respectively, and cooperating at equal times and in unison with said displacement means for maintaining equal movements of said displacement means so that fluid flows in said outlets at proportionate and equal flow rates; a pair of delivery passage means connecting each of said outlets with a different one of said motors, respectively; said actuator means set to provide equal strokes of said displacement means; said motors containing fluid intaking chambers of equal number and equal volumes for equal number of revolutions at equal quantities of intake of flow of fluid; said motors having each at least one pair of ports; said ports of said motors of each pair of motors on opposite sides of said medial plane communicated vice-versa to said delivery passage means for revolving said motors of the respective pair of motors in opposite directions at equal rate of revolutions, whereby said stream-creating means on opposite sides of said medial plane are torque-balanced and driven at equal velocities for producing equal thrusts on both sides of said medial plane to stabilize the movement and attitude of said aircraft; wherein said wing includes at least one hollow space; wherein said fluid stream creation means includes at least one propeller; wherein said propeller includes at least two blades which are swingably borne in a holding portion; wherein said blades of said propellers can be swung from a position normal to the axis of the said propeller to a position substantially parallel to the axis of said propeller; wherein said hollow space is associated to guide means; wherein said motor is provided with at least one guide portion; wherein said guide portion of said motor is borne and guided by said guide means of said hollow portion of said wing; wherein said motor is moveable in said hollow space in the direction of the axis of said motor and wherein said motor and said propeller are contained in said hollow space, when said propeller blades are swung into the said position parallel to the axis of said motor and when said motor is retracted to the innermost position in said hollow space, while said blades of said propeller can be swung into both of said positions when said motor is moved into the outermost position relatively to said hollow space.

* * * * *